US011416198B2

(12) United States Patent
Mariyama

(10) Patent No.: US 11,416,198 B2
(45) Date of Patent: Aug. 16, 2022

(54) DOCUMENT MANAGEMENT SYSTEM, DOCUMENT MANAGEMENT DEVICE, AND NON-TRANSITORY COMPUTER READABLE MEDIUM FOR COMPUTING A NUMBER OF OTHER USERS WHO HAVE PRINTED A DOCUMENT

(71) Applicant: FUJI XEROX CO., LTD., Tokyo (JP)

(72) Inventor: Daiki Mariyama, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/166,230

(22) Filed: Feb. 3, 2021

(65) Prior Publication Data
US 2022/0035587 A1 Feb. 3, 2022

(30) Foreign Application Priority Data

Jul. 29, 2020 (JP) .............................. JP2020-128470

(51) Int. Cl.
*G06F 3/12* (2006.01)
(52) U.S. Cl.
CPC .......... *G06F 3/1267* (2013.01); *G06F 3/1222* (2013.01); *G06F 3/1238* (2013.01)

(58) Field of Classification Search
None
See application file for complete search history.

(56) References Cited

U.S. PATENT DOCUMENTS

| 8,823,978 B2 * | 9/2014 | Kimura | ................... G06F 16/93 358/1.15 |
| 2004/0193546 A1 * | 9/2004 | Tokutani | ................ G06Q 10/10 705/59 |

FOREIGN PATENT DOCUMENTS

JP 2014-13983 A 1/2014

* cited by examiner

*Primary Examiner* — Thomas D Lee
(74) *Attorney, Agent, or Firm* — Oliff PLC

(57) ABSTRACT

A document management system includes a processor configured to receive print data of a document to be printed, the print data being transmitted from a first user, transmit, to another user belonging to a predetermined group, document specification information that specifies the document when a request to print the document is received from the other user, and compute a number of other users who have printed the document on a basis of the document specification information and user specification information that specifies another user, the information being transmitted from a printing device when the other user uses the printing device to print the document on a basis of the document specification information.

15 Claims, 7 Drawing Sheets

FIG. 7A

| FILE SPECIFICATION KEY | STORAGE LOCATION | NUMBER OF PEOPLE IN GROUP | USER ID |
|---|---|---|---|
| 12345678 | FileServer/file/12345678 | 3 | a6384 |

| FILE SPECIFICATION KEY | PRINT TIME | PAPER SIZE | COLOR MODE | DUPLEX SETTING | USER ID |
|---|---|---|---|---|---|
| 12345678 | 12/1/2019 10:35 | A4 | COLOR | DOUBLE-SIDED | c3261 |
| 12345678 | 12/1/2019 10:36 | A3 | BLACK AND WHITE | SINGLE-SIDED | d8112 |
| 12345678 | 12/1/2019 10:36 | A4 | COLOR | DOUBLE-SIDED | a6638 |
| 12345678 | 12/1/2019 10:38 | A3 | BLACK AND WHITE | SINGLE-SIDED | b9124 |

T2

DOCUMENT MANAGEMENT SYSTEM, DOCUMENT MANAGEMENT DEVICE, AND NON-TRANSITORY COMPUTER READABLE MEDIUM FOR COMPUTING A NUMBER OF OTHER USERS WHO HAVE PRINTED A DOCUMENT

CROSS-REFERENCE TO RELATED APPLICATIONS

This application is based on and claims priority under 35 USC 119 from Japanese Patent Application No. 2020-128470 filed Jul. 29, 2020.

BACKGROUND

(i) Technical Field

The present disclosure relates to a document management system, a document management device, and a non-transitory computer readable medium.

(ii) Related Art

In the related art, there exists a method of controlling the execution of a print job of the document on the basis of information that identifies the document, such as a Quick Response (QR) code.

Japanese Unexamined Patent Application Publication No. 2014-13983 discloses an integrated security system in which a digital multi-function device transmits job history information generated in association with job execution to a job history information auditing server. Here, the job history information auditing server performs a keyword filtering process, and saves job history information including image data specification information together with job execution control information. The digital multi-function device receives a job execution instruction from a user, reads information embedded in a paper medium from the image data, and acquires image data specification information. The digital multi-function device transmits the image data specification information to the job history information auditing server, receives job execution control information about the relevant image data. The digital multi-function device controls the execution of the job according to the job execution control information.

SUMMARY

When a document file uploaded by a first user is downloaded and printed by other users, it may be desirable in some cases to know how many people have printed the document file. For example, from the number of people who have printed the document file, the first user is able to know how many other users who belong to a predetermined group have already printed the document file.

However, although the number of times the document file has been printed may be ascertained by referencing a print history, it is difficult to ascertain the number of people who have printed the document file.

Aspects of non-limiting embodiments of the present disclosure relate to ascertaining and utilizing the number of people who have printed a document file compared to a case of not ascertaining the number of people who have printed a document file.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided a document management system including a processor configured to receive print data of a document to be printed, the print data being transmitted from a first user, transmit, to another user belonging to a predetermined group, document specification information that specifies the document when a request to print the document is received from the other user, and compute a number of other users who have printed the document on a basis of the document specification information and user specification information that specifies another user, the information being transmitted from a printing device when the other user uses the printing device to print the document on a basis of the document specification information.

BRIEF DESCRIPTION OF THE DRAWINGS

An exemplary embodiment of the present disclosure will be described in detail based on the following figures, wherein:

FIGS. 7A and 7B are diagrams illustrating data structures of data registered in a document file information database and a print result database.

DETAILED DESCRIPTION

<Overall Description of Print System 1>

Figure 1:
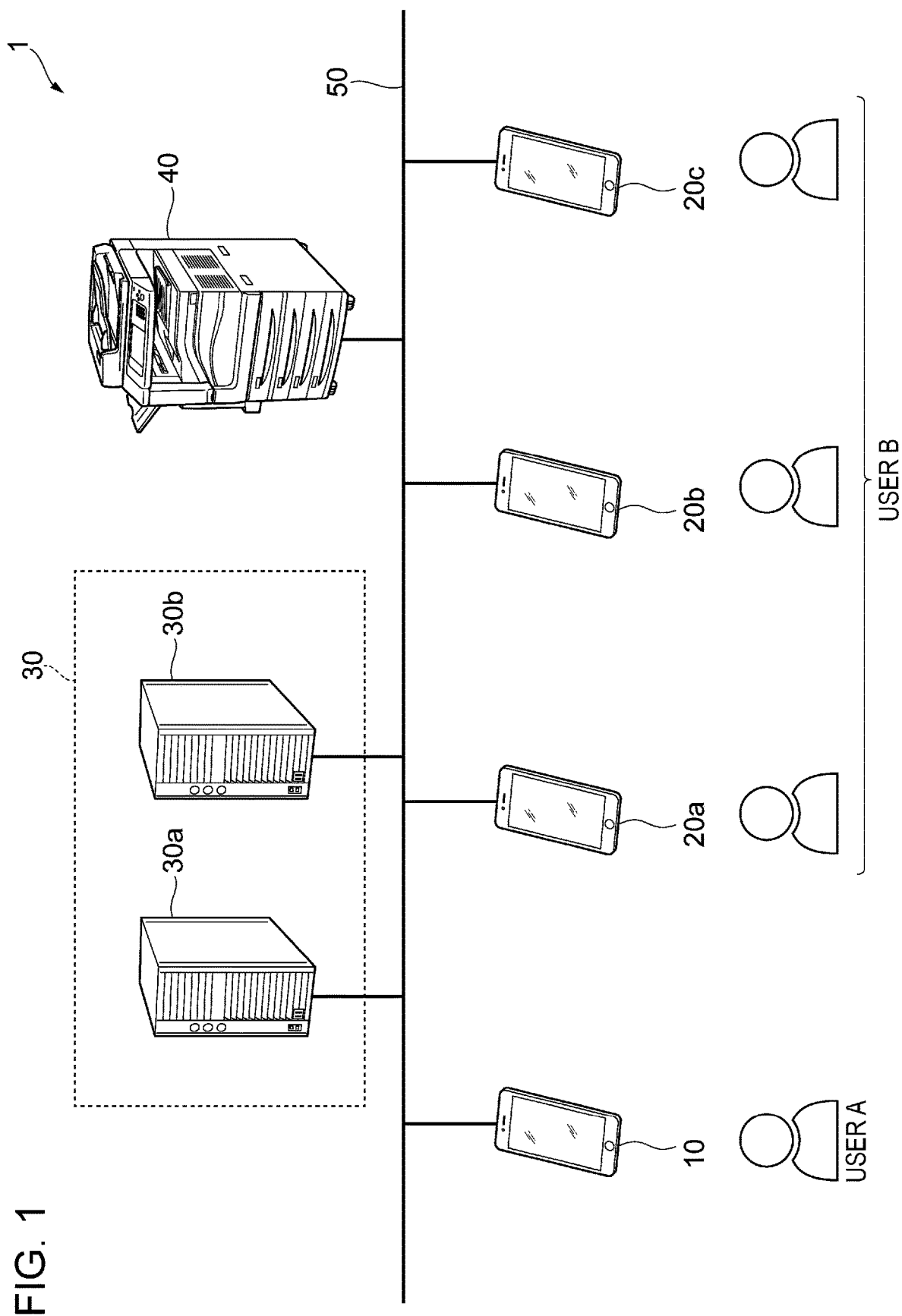
FIG. 1 is a diagram illustrating an exemplary configuration of a print system according to an exemplary embodiment.

FIG. 1 is a diagram illustrating an exemplary configuration of a print system 1 according to an exemplary embodiment.

In the print system 1 illustrated in the diagram, a terminal device 10 carried by a user A, terminal devices 20a, 20b, and 20c carried by multiple users B, a document management system 30 that manages documents, and an image forming device 40 that prints documents are connected over a network 50.

Note that although three terminal devices 20 are illustrated in FIG. 1, there may be any number of terminal devices 20. Note that in the following, the terminal devices 20a, 20b, and 20c may simply be referred to as the terminal device(s) 20 when not being individually distinguished. Also, in the following, a "document" refers to an electronic document obtained by digitizing or computerizing text information, image information, or both. Properties such as the format and data structure of the electronic document are not particularly limited insofar as the electronic document is handleable by each of the terminal device 10, the terminal devices 20, the document management system 30, and the image forming device 40.

The terminal device 10, following an instruction from the user A, uploads a document file to be printed by the image forming device 40 to the document management system 30.

The terminal devices 20 are devices with which the users B issue a print instruction with respect to the document to be printed by the image forming device 40.

The terminal device 10 and the terminal devices 20 are computer devices such as general-purpose personal computers (PCs), mobile computers, mobile phones, smartphones, or tablets, for example. Additionally, the terminal device 10 and the terminal devices 20 upload documents and issue print instructions by running various types of application software under the management of an operating system (OS).

The document management system 30 manages document files, which are one example of document print data. The document management system 30 is a computer system that manages the entire print system 1. In the exemplary embodiment, the document management system 30 includes a bot server 30a and a file server 30b.

The bot server 30a is a server computer on which a bot runs. The bot has a social network service (SNS) account, and when a document file is transmitted to the SNS account, the bot receives the document file. In other words, the bot server 30a functions as an example of a print reception device that receives a document file.

The file server 30b is a server computer that saves documents. The file server 30b archives and manages document files received by the bot server 30a. In other words, the file server 30b functions as an example of a document management device that manages document files.

The terminal device 10, the terminal devices 20, and the document management system 30 are each provided with a central processing unit (CPU) that acts as a computational unit, and main memory as well as storage such as a hard disk drive (HDD) or a solid-state drive (SSD) that act as storage units. Here, the CPU is one example of a processor, and executes various software such as an OS (basic software) and application software. Also, the main memory is a storage area that stores information such as various software and data used to execute the software, while the storage is a storage area that stores information such as input data that is input into various software and output data that is output from various software.

Furthermore, the terminal device 10, the terminal devices 20, and the document management system 30 are each provided with a communication interface (hereinafter designated "communication I/F") for communicating externally, a display mechanism including video memory, a display, and the like, and input devices such as a keyboard, a mouse, and a touch panel.

The image forming device 40 is an example of a printing device that prints documents, and is a device provided with a printer function that forms an image on a recording medium such as paper, and outputs the recording medium with the image formed thereon as a printed document. In addition to the printer function, the image forming device 40 may also be provided with other image processing functions, such as a scanner function and a facsimile function, for example.

Figure 2:
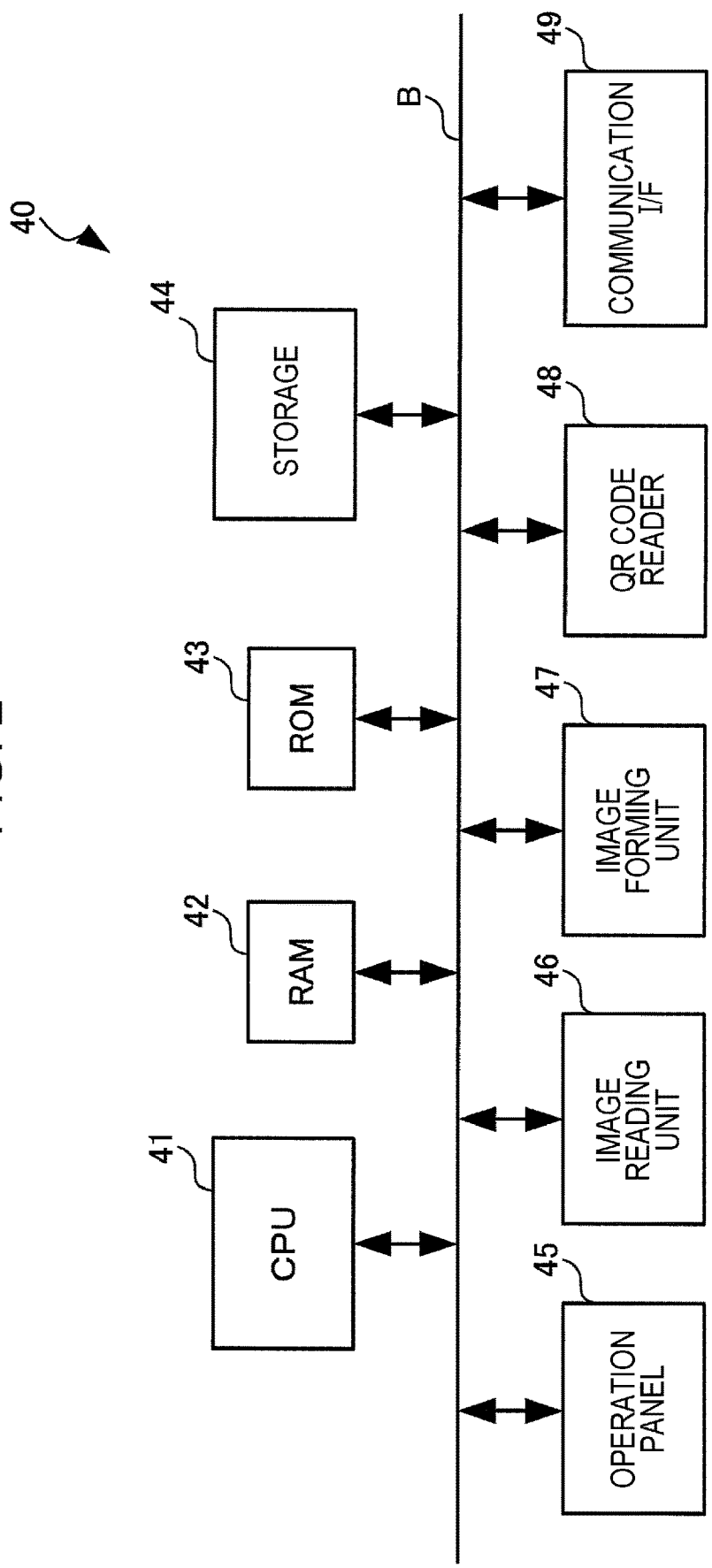
FIG. 2 is a diagram illustrating an exemplary hardware configuration of an image forming device.

FIG. 2 is a diagram illustrating an exemplary hardware configuration of the image forming device 40.

As illustrated in the diagram, the image forming device 40 is provided with a CPU 41, random access memory (RAM) 42, read-only memory (ROM) 43, storage 44, an operation panel 45, an image reading unit 46, an image forming unit 47, a QR code reader 48, and a communication I/F 49. Additionally, these components exchange data through a bus B.

The CPU 41 achieves each of functions described later by loading various programs stored in the ROM 43 or elsewhere into the RAM 42 and executing the programs.

The RAM 42 is memory used as work memory for the CPU 41, for example.

The ROM 43 is memory that stores information such as the various programs executed by the CPU 41.

The storage 44 is an HDD or an SSD, and stores information such as image information that has been read by the image reading unit 46 and image information used for image formation in the image forming unit 47.

The operation panel 45 is for example a touch panel that displays various information and accepts operation input from a user. In the case where the operation panel 45 is a touch panel, the operation panel 45 is provided with a display such as a liquid crystal display (LCD) panel that displays content (informational content) as an image in a predetermined area. Additionally, the operation panel 45 is provided with a function of detecting the position where a contacting object, typically a person's finger or a stylus, touches the LCD panel or the like. In the exemplary embodiment, the touch panel is not particularly limited, and various touch panels such as resistive and capacitive touch panels may be used.

The image reading unit 46 reads an image recorded onto an original document. The image reading unit 46 is a scanner, for example, and may be a charge-coupled device (CCD) scanner in which light from a light source is radiated onto a document and the reflected light therefrom is focused by a lens and sensed by a CCD, or a contact image sensor (CIS) scanner in which light from light-emitting diode (LED) light sources is radiated onto a document and the reflected light therefrom is sensed by a CIS.

The image forming unit 47 is an example of a printing mechanism that forms an image onto a recording medium. Here, the image forming unit 47 is a printer, for example, and may be an electrophotographic system in which an image is formed by causing toner adhering to a photoconductor to be transferred to a print medium such as a paper sheet, or an inkjet printer in which an image is formed by ejecting ink onto a print medium.

The QR code reader 48 is a device that optically reads a QR code held up to the device. The QR code reader 48 is provided with a light source such as an LED, a lens, and a charge-coupled device (CCD) image sensor, for example. A QR code is irradiated with light from the light source, reflected light reflected from the QR code is formed into an image by the lens, and the formed optical image is photoelectrically converted by the CCD image sensor. Thereafter, the QR code is read on the basis of an analog image signal output from the CCD image sensor.

The communication I/F 49 transmits and receives various information to and from other devices over the network 50.

The network 50 is a communication medium used for information communication between the terminal device 10, the terminal devices 20, the document management system 30, and the image forming device 40, and may be the Internet, a local area network (LAN), or a wide area network (WAN), for example. The communication channel used for information communication may be wired, wireless, or a combination of the two. Additionally, the terminal device 10, the terminal devices 20, and the document management system 30 may also be connected through multiple networks and communication channels by using a relay device such as a gateway or a router.

<General Description of Operations by Print System 1>

Figure 3:
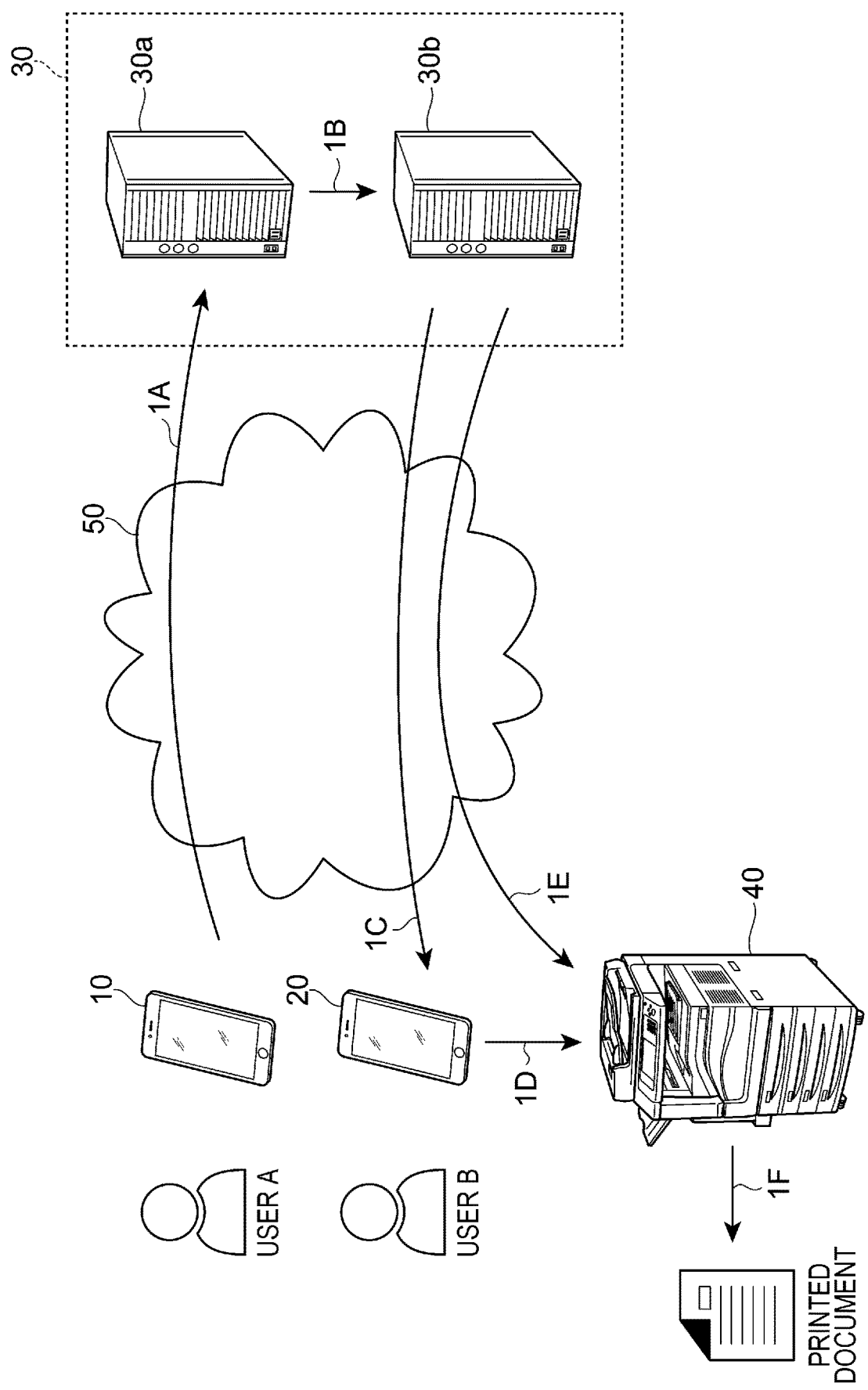
FIG. 3 is a diagram illustrating general operations by the print system.

FIG. 3 is a diagram illustrating general operations by the print system 1.

A user A and a user B belong to the same SNS group, for example. The user A operates the terminal device 10 to upload a document file to the document management system 30 (1A). This "group" is a collection of users. The form of the group is not particularly limited. For example, a division of a company may be treated as a group. Also, a class of a school may be treated as a group. Also, the user A is an example of a first user. Meanwhile, the user B is an example of another user who belongs to a predetermined group. The user B belongs to the same group as the user A, and is a user other than the user A within the group. Note that any user within the same group may act as the user A.

The document file is received by the bot server 30a and archived by the file server 30b of the document management system 30 (1B).

Multiple users B are each able to print the document using the image forming device 40. The image forming device 40 is provided in a location such as a convenience store, for example, and is a device that may be used to print documents by paying a preset fee.

At this time, if one of the users B operates the terminal device 20 to issue a print request, specification information containing information that specifies the user and information that specifies the document is sent from the file server 30b as information used for printing (1C).

Thereafter, the user B passes the specification information to the image forming device 40 (1D). In the image forming device 40, a document file is acquired from the file server 30b (1E) and a document is printed (1F) on the basis of the specification information. Thereafter, the user B receives the printed document, that is, the document printed by the image forming device 40.

With this arrangement, a document file may be shared among users belonging to the same SNS group and documents may be printed on the basis of the document file.

<Description of Functional Configuration of Print System 1>

Figure 4:
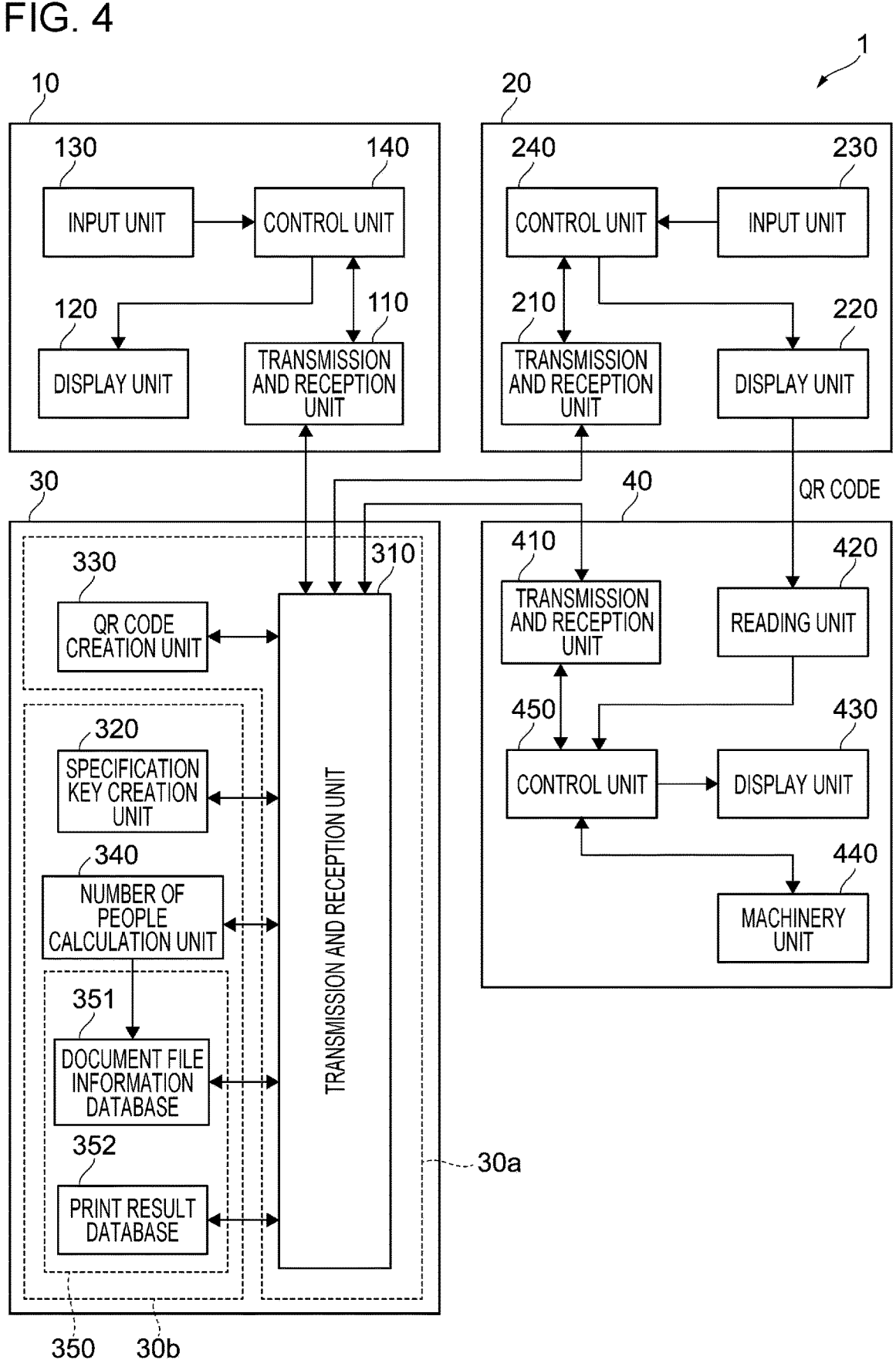
FIG. 4 is a block diagram for explaining an exemplary functional configuration of the print system.

FIG. 4 is a block diagram for explaining an exemplary functional configuration of the print system 1.

Note that the diagram illustrates a selection of units related to the exemplary embodiment from among a variety of functions included in the print system 1.

the terminal device 10 of the print system 1 illustrated in the diagram is provided with a transmission and reception unit 110 that transmits and receives information with respect to external devices, a display unit 120 that displays images, an input unit 130 that inputs instructions from a user, and a control unit 140 that controls the terminal device 10 overall.

The transmission and reception unit 110 uploads a document file to the document management system 30.

The display unit 120 displays a selection screen when uploading a document file and a notification from the document management system 30.

The input unit 130 is a mechanism that accepts a selection of a document file and an upload instruction from the user A when uploading a document file.

Note that a display device and an input device may also be a device such as a touch panel provided with the functions of both devices.

The control unit 140 controls the terminal device 10 overall. The control unit 140 creates an image to be displayed by the display unit 120. Also, the control unit 140 uploads a document file from the transmission and reception unit 110 according to an instruction from the user input using the input unit 130.

The terminal device 20 has a configuration similar to the terminal device 10, and is provided with a transmission and reception unit 210, a display unit 220, an input unit 230, and a control unit 240.

The transmission and reception unit 210 requests the document management system 30 to print a document file. Also, at this time, the transmission and reception unit 210 additionally transmits the user ID of a user B to the document management system 30. Thereafter, the transmission and reception unit 210 receives a QR code generated by the document management system 30 as a result.

The display unit 220 displays the QR code received from the document management system 30. The QR code is used when printing using the image forming device 40.

The input unit 230 is a mechanism that accepts a selection of a document file and a print request instruction from the user B when requesting the document management system 30 to print a document file.

The control unit 240 controls the terminal device 20 overall. The control unit 240 creates an image to be displayed by the display unit 220. Also, the control unit 240 requests the document management system 30 to print a document file through the transmission and reception unit 210 according to an instruction from the user input using the input unit 230.

The transmission and reception units 110 and 210 correspond to a communication I/F, for example. Also, the display units 120 and 220 correspond to a display device such as a display, for example. Furthermore, the input units 130 and 230 correspond to an input device, for example. Furthermore, the control units 140 and 240 correspond to a CPU, for example.

The document management system 30 is provided with a transmission and reception unit 310 that transmits and receives information such as a document file, a specification key creation unit 320 that creates a file specification key that specifies a document file, a QR code creation unit 330 that creates a QR code containing the file specification key, a number of people calculation unit 340 that calculates the number of users B who have printed a document file, and a saving unit 350 that saves document files.

The transmission and reception unit 310 transmits and receives document files with respect to the terminal devices 10 and 20 over the network 50. The transmission and reception unit 310 receives a document sent from the user A to be printed. The transmission and reception unit 310 correspond to a communication I/F, for example.

The specification key creation unit 320 creates a file specification key that specifies a document file. The file specification key is an example of document specification information, which is information that specifies a document. The "file specification information" is information for specifying a document file. The file specification key is information such as a document ID assigned to a document file when the document file is uploaded from the user A.

The QR code creation unit 330 creates a QR code to hold up to the QR code reader 48 of the image forming device 40 when one of the users B uses the image forming device 40 for printing. The QR code contains the file specification key created by the specification key creation unit 320. The QR code also contains the user ID of the user B. The user ID is an example of user specification information that specifies the user B. "User specification information" is information for specifying who a user is.

The number of people calculation unit 340 calculates the number of users B who have printed. Although described in detail later, the number of people calculation unit 340 calculates the number of users B who have printed on the basis of the file specification key and the user ID sent from the image forming device 40 when a document is printed by the image forming device 40. The specification key creation unit 320, the QR code creation unit 330, and the number of people calculation unit 340 correspond to a CPU, for example.

The saving unit 350 saves document files. The saving unit 350 also saves file specification keys, user IDs, and print settings when one of the users B prints. The saving unit 350 corresponds to storage, for example.

Also, the saving unit 350 is provided with a document file information database 351 that registers information related to document files and a print result database 352 that registers print results, which are the result of printing document files. Although described in detail later, when the user A uploads a document file, the document file, information about the user A, and the like are registered in the document file information database 351. Also, although described in detail later, the user ID of each user who prints a document, the print settings, and the like are registered as a print result in the print result database 352.

In the exemplary embodiment, the transmission and reception unit 310 and the QR code creation unit 330 are functions provided in the bot server 30a. Meanwhile, the specification key creation unit 320, the number of people calculation unit 340, and the saving unit 350 are functions provided in the file server 30b. However, each of the function units of the transmission and reception unit 310, the specification key creation unit 320, the QR code creation unit 330, the number of people calculation unit 340, and the saving unit 350 may be achieved by either of the bot server 30a and the file server 30b. For example, the number of people calculation unit 340 is described as being provided in the file server 30b, but may also be provided in the bot server 30a, and the bot server 30a may calculate the number of users B. Also, each of the function units of the bot server 30a and the file server 30b may also be collectively built into a single server computer.

The image forming device 40 is provided with a transmission and reception unit 410 that transmits and receives information with respect to external equipment, a reading unit 420 that reads a QR code, a display unit 430 that displays a print settings screen, a machinery unit 440 that achieves the functions of the image forming device 40, and a control unit 450 that controls the image forming device 40.

The transmission and reception unit 410 receives a document file uploaded from the terminal device 10. The transmission and reception unit 410 correspond to the communication I/F 49, for example.

The reading unit 420 reads a QR code displayed on the display unit 220 of the terminal device 20. The reading unit 420 corresponds to the QR code reader 48, for example.

The display unit 430 displays a print settings screen, which is a screen for adjusting the settings used to print a document, as well as user guidance. The user guidance explains how to operate the image forming device 40 and also explains a fee imposed on printing, for example.

The machinery unit 440 is equipment such as the scanner and the printing mechanism described above. The machinery unit 440 corresponds to the image reading unit 46 and the image forming unit 47.

The control unit 450 is an example of a print control device, and controls the image forming device 40 overall. The control unit 450 corresponds to the CPU 41, the RAM 12, and the ROM 13, for example.

<Description of Operations by Print System 1>

Figure 5:
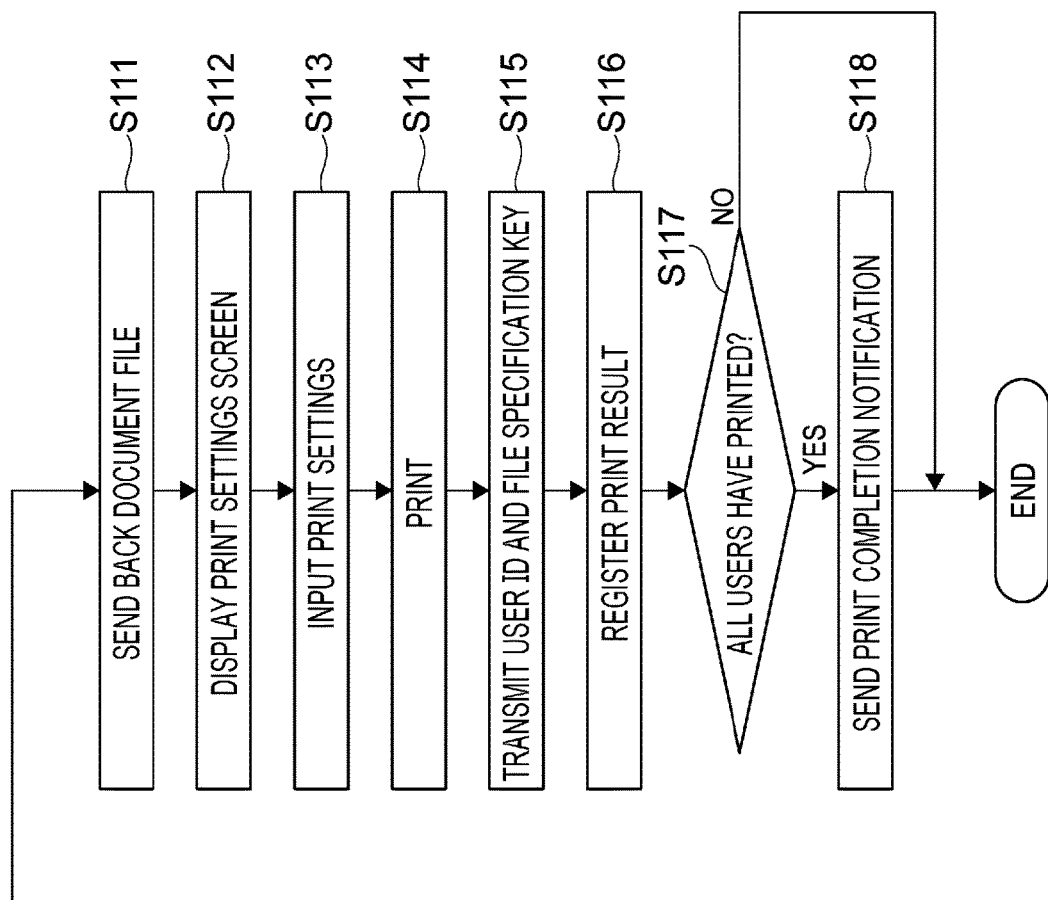
FIG. 5 is a flowchart for explaining operations by the print system.
Figure 5:
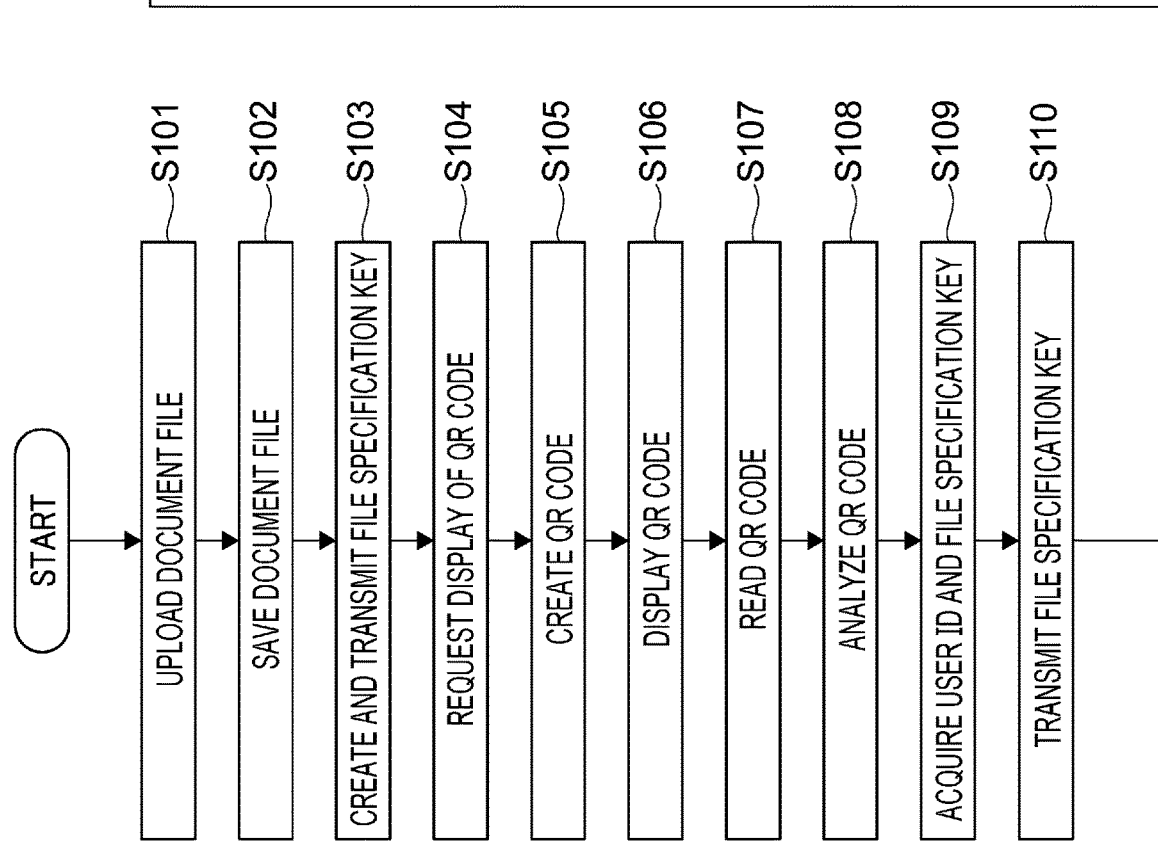
Figure 6:
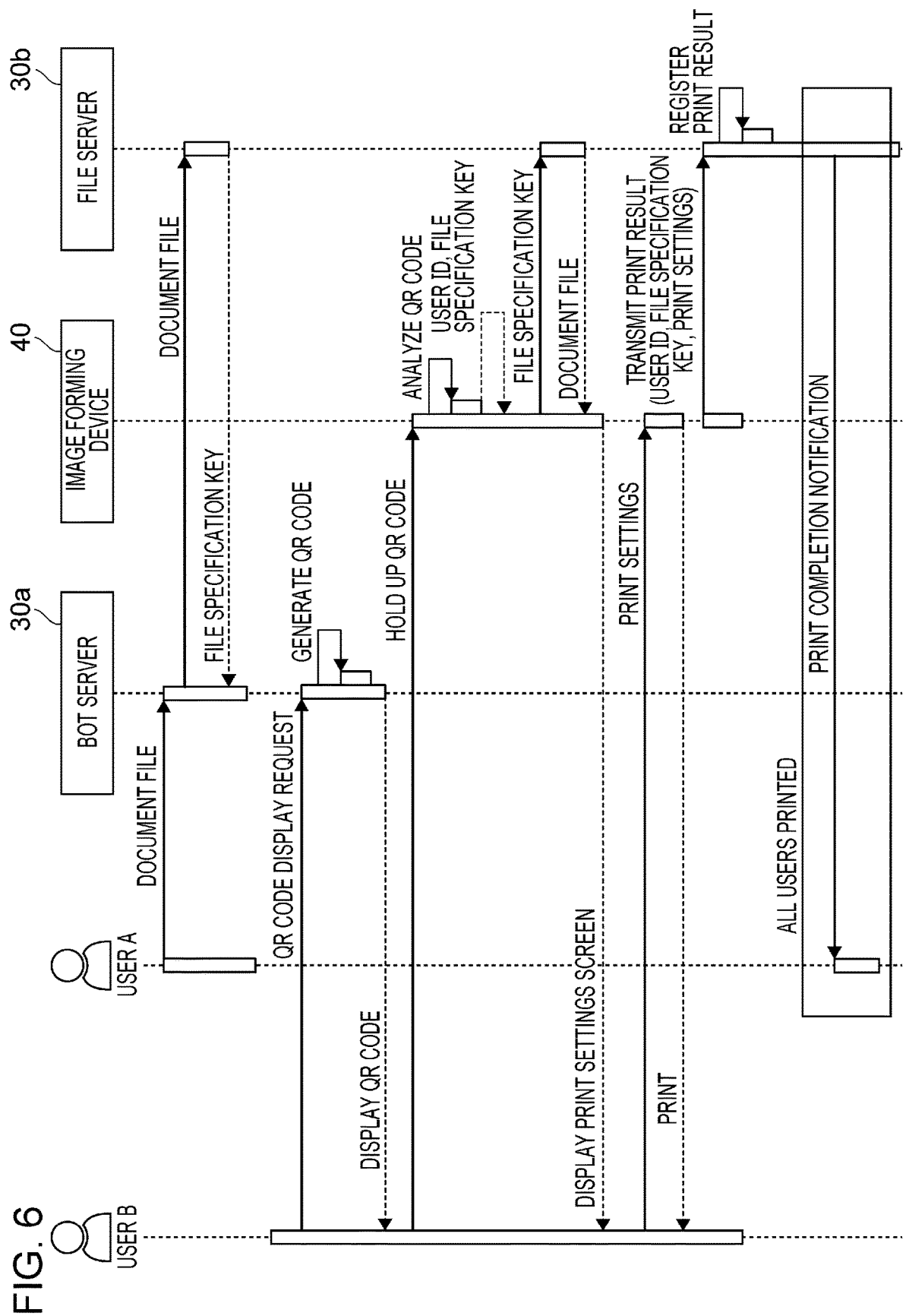
FIG. 6 is a sequence diagram for explaining operations by the print system.

FIG. 5 is a flowchart for explaining operations by the print system 1. Also, FIG. 6 is a sequence diagram for explaining operations by the print system 1. Hereinafter, FIGS. 4 to 6 will be used to describe operations by the print system 1.

First, the user A operates the input unit 130 from an operation screen displayed on the display unit 120 of the terminal device 10 to select a document file to upload, and gives an instruction to upload the selected document file. With this arrangement, the control unit 140 uploads the document file from the transmission and reception unit 110 to the document management system 30 (step 101).

The document file uploaded from the terminal device 10 is received by the transmission and reception unit 310 of the bot server 30a and saved by the saving unit 350 of the file server 30b (step 102). At this time, information related to the document file is registered in the document file information database 351.

Next, the specification key creation unit 320 of the file server 30b creates a file specification key, which is information that specifies the document, and transmits the created file specification key to the transmission and reception unit 310 of the bot server 30a (step 103).

Thereafter, in the case where one of the users B wants to print a document file, the user B operates the input unit 230 from an operation screen displayed on the display unit 220 of the terminal device 20 to select the desired document to print. The control unit 240 transmits a print request from the transmission and reception unit 210 to the document management system 30 as a QR code display request (step 104). Also, at this time, the control unit 240 additionally transmits a user ID, which is information that specifies the user B.

The QR code display request from the terminal device 10 is received by the transmission and reception unit 310 of the bot server 30a, and the QR code creation unit 330 of the bot server 30a creates a QR code (step 105). Information expressing a file specification key, which is information that specifies the document, and a user ID, which is information that specifies the user, is embedded in the QR code.

Thereafter, the transmission and reception unit 310 of the bot server 30a sends back the QR code to the terminal device 20, and in the terminal device 20, the QR code is displayed on the display unit 220 (step 106). In other words, the transmission and reception unit 310 transmits the file specification key together with the user ID to the user B as a QR code.

Next, the user B holds up the QR code displayed on the display unit 220 to the reading unit 420 of the image forming device 40. This causes the QR code to be read by the reading unit 420 (step 107).

Thereafter, the control unit 450 analyzes the QR code (step 108) and acquires the user ID and the file specification key (step 109).

Next, the control unit 450 transmits the acquired file specification key to the document management system 30 through the transmission and reception unit 410 (step 110).

In the document management system 30, the file server 30b sends back the corresponding document file to the image forming device 40 on the basis of the transmitted file specification key (step 111).

In the image forming device 40, the control unit 450 displays a print settings screen on the display unit 430 (step 112).

The user B operates the print settings screen and inputs appropriate print settings to print the document (step 113). The "print settings" are settings such as a size setting indicating the size of the printed document, a color mode setting indicating whether to print in color or in black and white, a duplex setting indicating whether to perform single-sided printing or double-sided printing, and a copies setting indicating the number of copies to output. Also, "print settings information" is information stipulating the print settings.

Thereafter, if the user B presses a Start key or the like, the printing of the document is started, and the user B is able to acquire a printed document (step 114).

When printing is finished, the image forming device 40 transmits the user ID and the file specification key to the document management system 30 as a print result (step 115). In other words, in this case, the document management system 30 acquires the user ID after the user B prints the document using the image forming device 40.

In the document management system 30, the number of people calculation unit 340 of the file server 30b registers the print result in the print result database 352 (step 116). From the print result database 352, the number of people calculation unit 340 is capable of calculating the number of users B who have printed the document file. In other words, because the user ID of each user B who has printed may be acquired from the print results, the number of people calculation unit 340 is capable of ascertaining which of the users B have printed. Furthermore, with this arrangement, the number of people calculation unit 340 is capable of calculating the number of users B who have printed the document file.

Additionally, from the number of users B who have printed, the number of people calculation unit 340 determines whether all of the users B have printed (step 117).

As a result, in the case where not all of the users B have printed (step 117, No), the series of processes ends.

On the other hand, in the case where all of the users B have printed (step 117, Yes), the number of people calculation unit 340 sends a print completion notification indicating that printing is complete to the user A (step 118). The "print completion notification" is a notification informing the user A that all of the users B have completed printing. The print completion notification is displayed on the terminal device 10 of the user A as a message, for example.

In other words, the number of people calculation unit 340 notifies the user A with information related to the number of users B who have printed the document. Here, when all of the users B who belong to a group have printed the document, a print completion notification indicating that printing is complete is sent to the user A on the basis of the number of users B who have printed the document. The number of people calculation unit 340 may also notify the user A with information such as the number of users B who have printed and the names of the users, even if not all of the users B have printed the document. In other words, the user A may also be notified about the ongoing progress of printing by the users B.

FIGS. 7A and 7B are diagrams illustrating data structures of data registered in the document file information database 351 and the print result database 352.

Of these, FIG. 7A illustrates the data structure of data registered in the document file information database 351.

As described above, the document file information database 351 registers information related to the document file uploaded by the user A. Here, information related to the document file is registered as a document file table T1. Additionally, the file specification key, a storage location of the print file, the number of persons in the group, and the user ID of the user A are registered in the document file table T1.

Also, FIG. 7B illustrates the data structure of data registered in the print result database 352.

As described above, the print result database 352 registers print results. Here, print results are registered as a print result table T2. Additionally, the file specification key, a print time, a paper size indicating the size of the recording medium, the color mode, the duplex setting, and the user ID of the user B are registered in the print result table T2.

EXEMPLARY MODIFICATIONS

Hereinafter, exemplary modifications of the present disclosure will be described.

Exemplary Modification 1

In steps 112 and 113 of FIG. 5, the image forming device 40 displays the print settings screen, and the user B operates the print settings screen displayed on the print settings screen to input appropriate print settings to print the document.

On the other hand, in Exemplary Modification 1, the user B inputs print settings into the terminal device 20, and when transmitting the print request in step 104, the print settings are transmitted together with the file specification key and the user ID to the document management system 30. Additionally, when creating the QR code in step 105, the QR code creation unit 330 of the bot server 30a embeds the print settings together with the file specification key and the user ID. Furthermore, in step 106, the QR code is sent back to the terminal device 20. In other words, at this time, the bot server 30a transmits print settings, that is, information about the settings to be used to print the document set by the user B, together with the file specification key and the user ID to the user B as a QR code.

Thereafter, in step 107, when the QR code is read by the reading unit 420 of the image forming device 40, the print settings may be read along with the other information. As a result, the user B does not have to input the print settings on the print settings screen.

Exemplary Modification 2

The file server 30b may record the joining and leaving of users who belong to a group. In other words, in the related art, users belonging to a group may leave the group while new users may join the group, and the file server 30b records a history of such joining and leaving.

When users join or leave a group, the number of users to treat as the users B also increases or decreases, but in step 117 of FIG. 5, the number of people calculation unit 340 accounts for the increase or decrease in the number of other users belonging to the group to determine whether all of the users B have printed, and sends the print completion notification in step 118.

With this arrangement, even if users join or leave the group, the print completion notification may be transmitted to the user A in accordance with the number of users who belong to the group.

Note that the file server 30b may also notify a user who no longer belongs to the group with information related to the printing of a document. In this case, the file server 30b sends the notification to a private talk room for the user, for example.

Exemplary Modification 3

In step 101 of FIG. 5, the QR code created in step 105 may be created at the time when the user A uploads a document file to the document management system 30. In other words, because the users B who belong to the group may be ascertained in the document management system 30, the bot server 30a creates the QR code to transmit to each user B at this time. In this case, when the document file is received from the user A, the QR code creation unit 330 of the bot server 30a creates the QR code containing the file specification key and the user ID to transmit to each user B in advance.

With this arrangement, the time until the QR code is displayed on the terminal device 20 of the user B may be shortened compared to the case where the QR code is created after the user B transmits a QR code display request.

Exemplary Modification 4

The file server 30b may set a time limit on when a document may be printed. For example, a validity period may be set for a document file, and if the current time is outside the validity period, the file server 30b does not perform the process of sending back the document file to the image forming device 40 in step 111 of FIG. 5.

Additionally, a reminder notification that reminds a user B who has not yet printed to print may be transmitted from the file server 30b according to the time limit. The "reminder notification" is a notification reminding the user B to print. The reminder notification is displayed on the terminal device 20 of the user B as a message, for example. In this case, the reminder notification is transmitted a predetermined amount of time before the time limit.

This arrangement makes it easy to cause all of the users B to complete printing by the time limit, and also saves the user A from the burden of reminding the users B to print.

Exemplary Modification 5

In addition, the file server 30b may also extend the time limit. In this case, for example, the file server 30b determines whether or not a user B who has not printed exists even though the time limit is approaching. Additionally, in the case where a user B who has not printed exists, the file server 30b asks whether or not to extend the time limit for the user B. Thereafter, the file server 30b extends the time limit in the case of receiving a reply for extending the time limit from one of the users. This may be rephrased as extending the time limit when a time limit extension request is received from the user B and the time limit extension is approved.

By extending the time limit, the user A is saved from the burden of having to upload the document again and cause the user B who has not printed to print the document. Furthermore, the user B who was unable to print by the time limit may be given relief.

Exemplary Modification 6

The file server 30b may remove the document file after the above time limit expires. In this case, when transmitting the above reminder notification, the file server 30b transmits a removal notification indicating that the document file will be removed according to the time limit. The "removal notification" is a notification informing the users B about the removal of the document file. The removal notification is displayed on the terminal device 20 of the user B as a message, for example. Additionally, the document file is not removed when a request to negate the removal of the document file is received from one of the users. Conversely, the document file is removed when no request is received. Note that the document file may also be removed before the time limit when all of the users B have printed.

By removing document files, it is possible to keep the storage capacity of the saving unit 350 from running low.

Exemplary Modification 7

In the example described above, the user ID is taken to be user specification information that specifies the user B, but is not limited thereto. For example, the user specification information may be an electronic money account used by the user B. In other words, in the case where the image forming device 40 is a device that is provided in a location such as a convenience store and may be used to print documents by paying a preset fee as described above, the user B is able to pay the fee using electronic money. Additionally, the electronic money account used at this time is treated as the user specification information.

This case has an advantage in that the image forming device 40 does not have to include the QR code reader 48.

Exemplary Modification 8

The user B may also print the document multiple times. Furthermore, the document may be printed multiple times using different print settings. In this case, for example, after the user B prints, the image forming device 40 displays a screen asking the user B whether or not to print again using different print settings. As a result, the user B is able to adjust the print settings again and print the document. Additionally, at this time, the print result in step 115 of FIG. 5 is not transmitted every time printing is performed, but instead is transmitted collectively for the multiple printings. This arrangement decreases the number of times that a print result is transmitted.

Exemplary Modification 9

In the example described above, the file specification key and the user ID are embedded into a QR code, but the configuration is not limited thereto, and any code created according to a predetermined method may be used. For example, the code may also be a barcode, or an electronic watermark such as MISTCODE.

Note that in Exemplary Modifications 1 to 9 described above, processes performed by the bot server 30a may also be performed by the file server 30b, and processes performed by the file server 30b may also be performed by the bot server 30a. Also, a single server computer may perform these processes collectively.

As described in detail above, in the exemplary embodiment, by using a file specification key and a user ID, the number of people who have printed a document may be ascertained. In addition, this information may be utilized to transmit a print completion notification. Furthermore, in the exemplary embodiment, the file specification key and the user ID are embedded into a QR code, and by having the user B simply hold up the QR code to the QR code reader 48 of the image forming device 40, the information may be passed to the image forming device 40. For this reason, the user B does not have to log in to the image forming device 40 or perform actions such as specifying the document file. Consequently, the user B is able to print more easily.

<Description of Program>

Here, the processes performed by the document management system 30 according to the exemplary embodiment described above are prepared as a program such as software, for example. Furthermore, the processes are achieved through the cooperation of the software and hardware resources.

Consequently, the program that executes the processes performed by the document management system 30 may also be taken to be a program for causing a computer to achieve the functions of:

receiving print data of a document to be printed, the print data being transmitted from the user A, transmitting, to the user B belonging to a predetermined group, a file specification key that specifies the document when a request to print the document is received from the user B, and computing the number of users B who have printed the document on a basis of the file specification key and a user ID specifying the user B, the information being transmitted from the image forming device 40 when the user B uses the image forming device 40 to print the document on a basis of the file specification key.

Note that the program that achieves the exemplary embodiment obviously may be provided via a communication medium, and may also be provided by being stored on a recording medium such as CD-ROM.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A document management system comprising:
a processor configured to
receive print data of a document to be printed, the print data being transmitted from a first user,
transmit, to another user belonging to a predetermined group, document specification information that specifies the document when a request to print the document is received from the other user, and
compute a number of other users who have printed the document on a basis of the document specification information and user specification information that specifies another user, the information being transmitted from a printing device when the other user uses the printing device to print the document on a basis of the document specification information.

2. The document management system according to claim 1, wherein
the processor is configured to transmit the user specification information together with the document specification information to the other user.

3. The document management system according to claim 2, wherein
the processor is configured to create in advance the document specification information and the user specification information to transmit to the other user when the print data is received from the first user.

4. The document management system according to claim 2, wherein
the processor is configured to transmit a notification of information related to the printing of the document to another user who no longer belongs to the group.

5. The document management system according to claim 1, wherein
the processor is configured to transmit print settings information about settings to be used to print the document that have been set by the other user, together with the document specification information and the user specification information, to the other user.

6. The document management system according to claim 1, wherein
the processor is configured to acquire the user specification information after the other user prints the document using the printing device.

7. The document management system according to claim 6, wherein
the processor is configured to treat an electronic money account used by the other user as the user specification information.

8. The document management system according to claim 1, wherein
the processor is configured to notify the first user with information related to the number of other users who have printed the document.

9. The document management system according to claim 8, wherein
when all of the other users who belong to the group have printed the document, the processor is configured to transmit a print completion notification indicating that printing is complete to the first user, on a basis of the number of other users who have printed the document.

10. The document management system according to claim 9, wherein the processor is configured to transmit the print completion notification while also accounting for an increase or decrease in the number of other users belonging to the group.

11. The document management system according to claim 1, wherein
when a time limit on printing the document is set, the processor is configured to transmit a reminder notification reminding another user who has not printed to print the document according to the time limit.

12. The document management system according to claim 11, wherein
the processor is configured to
receive a request to extend the time limit from another user, and
extend the time limit when the extension of the time limit is approved.

13. The document management system according to claim 11, wherein
the processor is configured to
when transmitting the reminder notification, transmit a removal notification indicating that the document will be removed according to the time limit, and
not remove the document when a request to negate the removal of the document is received.

14. A document management device comprising:
a processor configured to
save print data of a document to be printed, the print data being transmitted from a first user,
generate document specification information that specifies the document when a request to print the document is received from another user belonging to a predetermined group, and
compute a number of other users who have printed the document on a basis of the document specification information and user specification information that specifies another user, the information being transmitted from a printing device when the other user uses the printing device to print the document on a basis of the document specification information.

15. A non-transitory computer readable medium storing a program causing a computer to execute a process for managing a document, the process comprising:
receiving print data of a document to be printed, the print data being transmitted from a first user;
transmitting, to another user belonging to a predetermined group, document specification information that specifies the document when a request to print the document is received from the other user; and
computing a number of other users who have printed the document on a basis of the document specification information and user specification information that specifies another user, the information being transmitted from a printing device when the other user uses the printing device to print the document on a basis of the document specification information.

* * * * *